(12) United States Patent
Keohane et al.

(10) Patent No.: US 9,043,882 B2
(45) Date of Patent: May 26, 2015

(54) INTEGRATION OF HOME SECURITY INTO EXISTING INFRASTRUCTURE

(71) Applicant: International Business Machines Corporation, Armonk, NY (US)

(72) Inventors: Susann M. Keohane, Austin, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 13/875,587

(22) Filed: May 2, 2013

(65) Prior Publication Data
US 2014/0331284 A1 Nov. 6, 2014

(51) Int. Cl.
*G06F 21/00* (2013.01)
*H04W 12/08* (2009.01)
*H04L 29/06* (2006.01)
*H04W 12/06* (2009.01)

(52) U.S. Cl.
CPC .............. *H04W 12/08* (2013.01); *H04L 63/08* (2013.01); *H04L 63/0876* (2013.01); *H04W 12/06* (2013.01); *H04L 63/083* (2013.01); *H04L 63/0884* (2013.01)

(58) Field of Classification Search
CPC ............ H04L 63/0884; H04L 63/0876; H04L 63/083; H04L 63/08; H04W 12/08; H04W 12/06
See application file for complete search history.

(56) References Cited

U.S. PATENT DOCUMENTS

| | | | |
|---|---|---|---|
| 8,289,130 B2 | 10/2012 | Nakajima et al. | |
| 2005/0226468 A1 | 10/2005 | Deshpande et al. | |
| 2007/0026854 A1* | 2/2007 | Nath et al. | 455/423 |
| 2009/0019531 A1* | 1/2009 | Rosenberger | 726/4 |
| 2011/0109715 A1 | 5/2011 | Jing et al. | |
| 2014/0165178 A1* | 6/2014 | Perrone et al. | 726/9 |

OTHER PUBLICATIONS

Huiqi Lu, et al.,"A Symbian Based Mobile User Authorization System Using Mobile Networks," IEEE, 2010, pp. 1-5.

* cited by examiner

*Primary Examiner* — Shewaye Gelagay
*Assistant Examiner* — Kendall Dolly
(74) *Attorney, Agent, or Firm* — Cantor Colburn LLP

(57) ABSTRACT

Embodiments relate to administering access to a wireless network by detecting a connective proximity of a device to the network, determining that the device is an authorized device based on information, connecting the authorized device to the network, and causing the connection of the authorized device to the network to be provided as an output status.

20 Claims, 4 Drawing Sheets

| Date | Time | Entry/Exit | Name | Username | Email | Phone No. | Unauth. |
|---|---|---|---|---|---|---|---|
| 2/5/2025 | 8:32:01AM | Entry | Jane Doe | JaneDoe2 | JaneDoe2@sp.com | 111-1111 | - |
| 2/5/2025 | 8:32:02AM | Exit | Jane Doe | JaneDoe2 | JaneDoe2@sp.com | 111-1111 | - |
| 2/5/2025 | 8:32:03AM | Entry | Jane Doe | JaneDoe2 | JaneDoe2@sp.com | 111-1111 | - |
| 2/5/2025 | 8:32:23AM | Exit | Jane Doe | JaneDoe2 | JaneDoe2@sp.com | 111-1111 | - |
| 2/5/2025 | 8:33:07AM | Entry | Jane Doe | JaneDoe2 | JaneDoe2@sp.com | 111-1111 | - |
| 2/5/2025 | 8:45:45AM | Entry | N/A | N/A-1 | N/A | N/A | - |
| 2/5/2025 | 8:50:41AM | - | N/A | N/A-1 | N/A | N/A | Yes |
| 2/5/2025 | 8:58:57AM | Exit | N/A | N/A-1 | N/A | N/A | - |
| 2/5/2025 | 9:24:22AM | Exit | Jane Doe | JaneDoe2 | JaneDoe2@sp.com | 111-1111 | - |

INTEGRATION OF HOME SECURITY INTO EXISTING INFRASTRUCTURE

BACKGROUND

The present invention relates generally to computing technology, and more specifically to an integration of home security into an existing network infrastructure.

Security systems may be used to determine if someone has entered a secured location. For example, security systems may be used to determine if someone (e.g., an intruder) is, or has been, located on a given property. In some instances security systems are able to identify such a person. However, security systems and video door phone intercom systems are expensive and require complex, specialized hardware.

BRIEF SUMMARY

An embodiment is directed to a method for administering access to a wireless network, comprising: detecting a connective proximity of a device to the network, determining that the device is an authorized device based on information, connecting the authorized device to the network, and causing the connection of the authorized device to the network to be provided as an output status.

An embodiment is directed to a computer program product comprising: a computer readable storage medium having program code embodied therewith for administering access to a wireless network, the program code executable by a processing device to: detect a connective proximity of a device to the network, determine that the device is an authorized device based on information, connect the authorized device to the network, and cause the connection of the authorized device to the network to be provided as an output status.

An embodiment is directed to an apparatus comprising: at least one processor, and memory having instructions stored thereon that, when executed by the at least one processor, cause the apparatus to: detect a connective proximity of a device to a wireless network, determine that the device is an authorized device based on information, connect the authorized device to the network, and cause the connection of the authorized device to the network to be provided as an output status.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is a log in accordance with one or more embodiments; and

DETAILED DESCRIPTION

Embodiments described herein are directed to methods, apparatuses, and systems for integrating security into a pre-existing infrastructure. In some embodiments, home security may be integrated into an existing network infrastructure. The use of mobile devices (e.g., smartphones) continues to increase. Such use may be based on the rich-feature set mobile devices provide relative to their compact form-factor. Some mobile devices have the ability to connect to one or more networks, such as a Wi-Fi network. A user of a mobile device may be identified when connected to a network. Accordingly, if a location (e.g., a home) includes a network, and a person who is "friendly" to the network (meaning that person has been provided a password, a PIN number, or other credential that provides access to the network) approaches the location, that person's information (e.g., their name, phone number, handle or username, etc.) could be made available to the owner or operator of the location.

Figure 1:
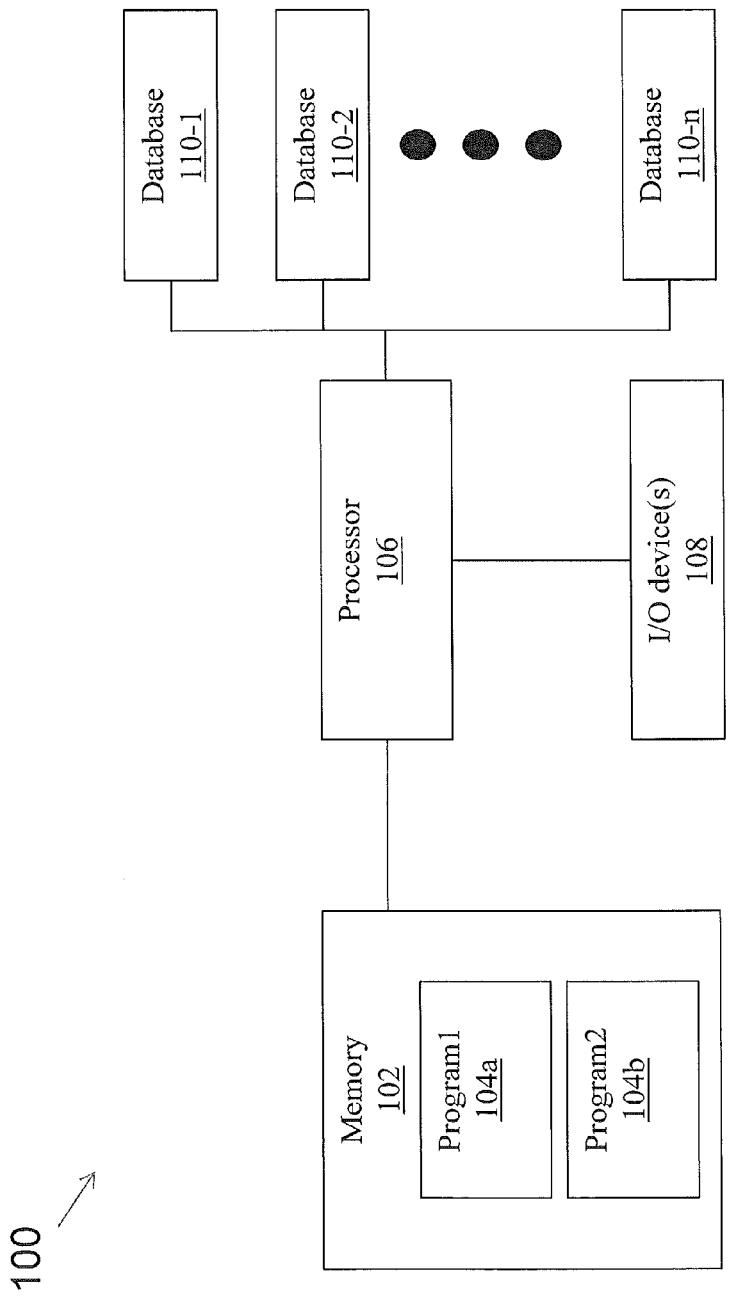
FIG. 1 is a schematic block diagram illustrating an exemplary computing system in accordance with one or more embodiments.

Referring to FIG. 1, an exemplary computing system 100 is shown. The system 100 is shown as including a memory 102. The memory 102 may store executable instructions. The executable instructions may be stored or organized in any manner and at any level of abstraction, such as in connection with one or more applications, processes, routines, procedures, methods, etc. As an example, at least a portion of the instructions are shown in FIG. 1 as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), etc. The I/O device(s) 108 may be configured to provide an interface to allow a user to interact with the system 100.

As shown, the processor 106 may be coupled to a number 'n' of databases, 110-1, 110-2, ... 110-n. The databases 110 may be used to store data, such as information that may be used to identify one or more users or persons associated with the system. Such identifying information may include one or more of a name, a residence, a mailing address, a phone number, a username or handle, and a credential (e.g., a password, a personal identification number (PIN), etc.), for example. The processor 106 may be operative on the data stored in the databases 110 to integrate security into an existing infrastructure as described herein.

The system 100 is illustrative. In some embodiments, one or more of the entities may be optional. In some embodiments, additional entities not shown may be included. For example, in some embodiments the system 100 may be associated with one or more networks, such as one or more computer, television, or telephone networks. In some embodiments, the entities may be arranged or organized in a manner different from what is shown in FIG. 1. For example, in some embodiments, the memory 102 may be coupled to or combined with one or more databases (e.g., databases 110-1 through 110-n).

Figure 2:
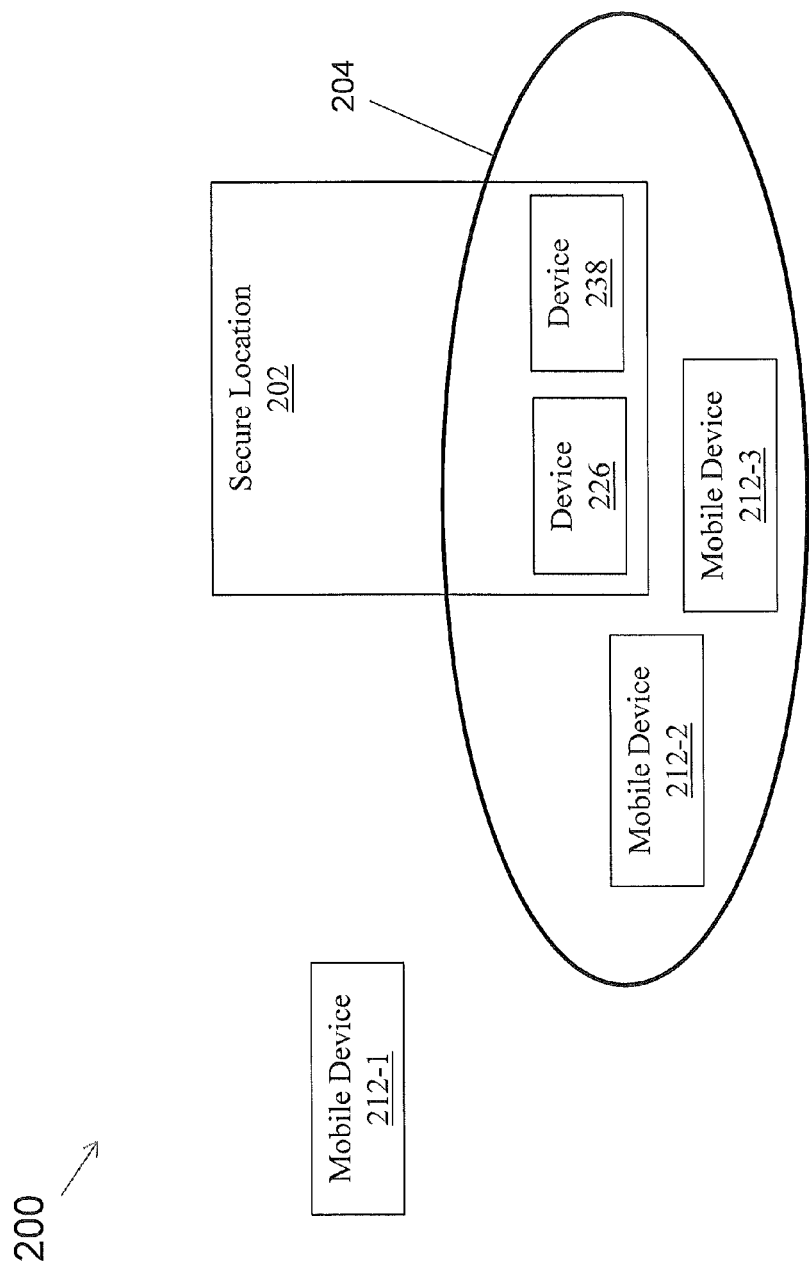
FIG. 2 is a block diagram of a system environment in accordance with one or more embodiments.

Turning now to FIG. 2, a system environment 200 in accordance with one or more embodiments is shown. The environment 200 is shown as including a secure location 202. For example, the secure location 202 may be a building, such as an office building or a house.

The secure location 202 may include, or be associated with one or more networks. The network(s) may include a wired network, a wireless network, a Wi-Fi network, etc.

In some embodiments, the network(s) may have a range, as reflected in FIG. 2 via the oval/circle 204. When a device is located within range (e.g., on or within the oval/circle 204), communication with that device may be established using the network(s). When the device is located outside of the range (e.g., outside of the oval/circle 204), communication with that device might not be possible. Thus, as shown in FIG. 2, a mobile device 212-1 might not be able to communicate using the network(s) as mobile device 212-1 is outside of the range 204. Conversely, a mobile device 212-2 is shown as being inside the range 204, and thus, the mobile device 212-2 may be able to communicate using the network(s).

When the mobile device 212-2 enters the range 204 of a network, the mobile device may automatically connect to the network. The mobile device 212-2 may automatically connect to the network if the mobile device 212-2 has information or data to enable the mobile device 212-2 to connect to the network. Such information/data may include a username and a password associated with the network. A password, or other credential, may be used to provide secure access to the network, such that only trusted devices or users may gain access to the network.

Assuming that the mobile device 212-2 has the necessary information/data to connect to the network, once the mobile device 212-2 connects to the network, an indication or status of the connection may be provided to a device 226 associated with the secure location. Such an indication/status may include an identification of the mobile device 212-2 or a user associated with the mobile device 212-2. In some embodiments, the indication/status may take one or more forms, such as a message, a displayed image or graphic, an auditory message, etc.

The device 226 may be any type of device. For example, the device 226 may include one or more of a television, a computer, a mobile device (e.g., a smartphone), etc.

In some embodiments, an alert or other indication may be provided by the device 226 when a device is detected that is not considered "friendly". For example, a mobile device 212-3 may be within range 204, but might not have a password or other credential to access the network. In some embodiments, a user or device may be declared unfriendly or unauthorized based on an attempt to connect to the network.

In some embodiments, the location 202 may be associated with a device 238. In some embodiments, the device 238 may be the same device as device 226. The device 238 may be configured to maintain a log or record of when users or devices enter or exit the range 204. An example of such a log 300 is shown in FIG. 3. A user of mobile device 212-2 may be named "Jane Doe" as known to a network associated with the location 202, and a user of mobile device 212-3 may generally be unknown to the network associated with the location 202.

As shown in the log 300, Jane Doe may quickly enter and exit the range 204 of the location 202 between 8:32:01 AM and 8:32:03 AM on the morning of Feb. 5, 2025. Such rapid exit and entry may simply be a result of fluctuations in the range 204 of the network, or Jane Doe temporarily standing at a location that is proximate to the perimeter of the range 204. In either case, in some embodiments hysteresis may be applied with respect to the log 300, such that one or more entries might not be recorded if they occur too rapidly (e.g., within a threshold amount of time of one another). As shown in the log 300, since Jane Doe is considered "friendly", various fields associated with Jane may be populated in the log 300, such as Jane's name, username, email address, and phone number.

The user of the mobile device 212-3 may enter within range 204 of the network on Feb. 5, 2025 at 8:45:45 AM and may exit the range 204 of the network on Feb. 5, 2025 at 8:58:57 AM. As the user of the mobile device 212-3 may be unknown, one or more of the fields of the log may be populated with a not available (N/A) character string. The username field may be populated with a unique identifier or number (e.g., N/A–1) in order to distinguish the mobile device 212-3 from another potential unknown device that may enter the range 204.

In some embodiments, if an unknown user or device attempts to obtain unauthorized access to the network, an entry may be indicated in the log 300 to indicate as such. For example, the user (N/A–1) of the device 212-3 may attempt to access the network at 8:50:41 AM on Feb. 5, 2025. The unauthorized attempt may be presented by the device 226.

In some embodiments, whether a particular user or device is "friendly" or not may be further broken down into additional categories. For example, categories of "friendly" may be used based on unique network passwords, a user's identity, etc. In some embodiments, a frequency associated with the user/device may be used to distinguish that user/device from other users/devices.

In some embodiments, analytics may be performed on a collection of data to determine if a user or device (e.g., a device 212) is a friend or a foe. For example, data may be gathered from a device 212's contact list or social media connections to determine whether a user of the device 212 is a friend or foe. If the device 212 has a threshold number of contacts or friends that are in common with an owner of the location 202, the device 226, or the device 238, then the (user of the) device 212 may be considered to be a friend and may be granted access to a network associated with the location 202. If the device 212 has a threshold number of contacts or friends that have been "blocked" by the owner of the location 202, the device 226, or the device 238, then the (user of the) device 212 may be considered to be a foe and may be denied access to the network.

Figure 4:
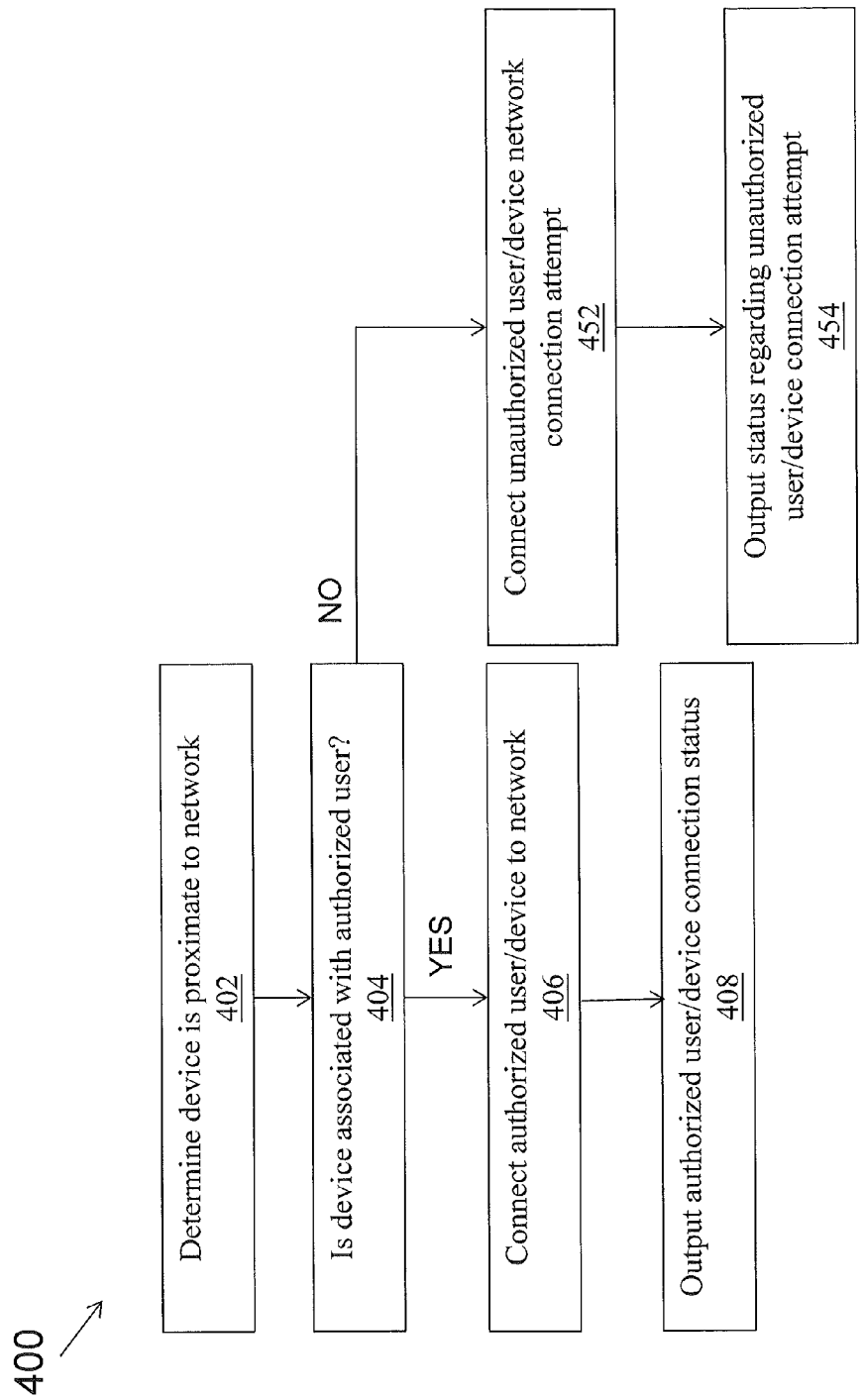
FIG. 4 illustrates a flow chart of an exemplary method in accordance with one or more embodiments.

Turning now to FIG. 4, a flow chart of an exemplary method 400 is shown. The method 400 may be executed by one or more systems, components, or devices, such as those described herein. The method 400 may be used administer access to a network.

In block 402, a determination may be made that a device (e.g., a mobile device) is proximate to, or within range of, the network. An entry may be created in a log reflecting such an event.

In block 404, a determination may be made whether the device of block 402 is associated with an authorized user. Such a determination may be based on one or more pieces of data or information, such as a user identifier and password (or other credential) combination, a social media or contact list, etc.

If, in block 404, a determination is made that the device is associated with an authorized user (e.g., the "Yes" path is taken out of block 404), flow may proceed from block 404 to block 406. Otherwise, if a determination is made that the device is associated with an unauthorized user (e.g., the "No" path is taken out of block 404), flow may proceed from block 404 to block 452. The status of whether the user is considered authorized or unauthorized may be included in the log.

In block 406, the authorized user may be connected to the network. As part of block 406, an entry may be created in the log reflecting the connection of the authorized user to the network.

In block 408, a status or indication may be generated and output reflecting the connection of the authorized user to the network. Such output may take one or more forms, such as a displayed message on a display device, an auditory sound or alert, etc.

In block 452, an attempt by the unauthorized user to connect to the network may be detected. As part of block 452, an entry may be created in the log reflecting the connection attempt of the unauthorized user to the network. The connection attempt of block 452 may be denied.

In block 454, a status or indication may be generated and output reflecting the connection attempt by the unauthorized user to the network. Such output may take one or more forms as described above.

Technical effects and benefits include an ability to integrate security features into one or more existing networks. Such a network may be of a type commonly included in a location (e.g., a house), such that specialized hardware might not be required. In this manner, security may be provided without incurring the cost or expense of a dedicated and complex security system. User interfaces may be provided that are intuitive and easy to use.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for administering access to a wireless network, comprising:
   detecting a connective proximity of a mobile device being carried by a first person to a wireless network access point device operating at a secure location of a second person;
   determining that the mobile device is an authorized device in response to determining that the mobile device has a threshold number of contacts or friends that are in common with a contact list or a social media list for the second person;
   determining that the first person is not an intruder to the secure location in response to determining that the mobile device is an authorized device;
   connecting the authorized device to the network;
   causing the connection of the authorized device to the network to be provided to the second person as a first output status that indicates that the first person is not an intruder to the secure location;
   determining that the mobile device is an unauthorized device in response to determining that the mobile device has a threshold number of contacts or friends that are blocked by the second person for the contact list or the social media list;
   determining that the first person is an intruder to the secure location in response to determining that the mobile device is an unauthorized device;
   detecting an attempt by the unauthorized device to connect to the network; and
   causing the attempt by the unauthorized device to connect to the network to be provided to the second person as a second output status that indicates that the first person is an intruder to the secure location.

2. The method of claim 1, further comprising:
   creating a log of authorized device connections and unauthorized device connection attempts.

3. The method of claim 1, wherein each of the first output status and the second output status is a message that is configured to be provided on a television connected to the network.

4. The method of claim 1, wherein the social media list and the contact list are associated with a mobile phone belonging to the second person.

5. The method of claim 1, further comprising determining that the mobile device is an authorized device based on a combination of a username and a password.

6. The method of claim 1, wherein the secure location of the second person is a building in which the second person is located.

7. The method of claim 1, wherein detecting the connective proximity of the mobile device to the wireless network access point device comprises detecting that the mobile device comes within a range from the wireless network access point device in which the mobile device becomes capable of being connected to the network.

8. A computer program product comprising:
   a non-transitory computer readable storage medium having program code embodied therewith for administering access to a wireless network, the program code executable by a processing device to:
   detect a connective proximity of a mobile device being carried by a first person to a wireless network access point device operating at a secure location of a second person;
   determine that the mobile device is an authorized device in response to determining that the mobile device has a threshold number of contacts or friends that are in common with a contact list or a social media list for the second person;
   determine that the first person is not an intruder to the secure location in response to determining that the mobile device is an authorized device;
   connect the authorized device to the network;
   cause the connection of the authorized device to the network to be provided to the second person as a first output status that indicates that the first person is not an intruder to the secure location;
   determine that the mobile device is an unauthorized device in response to determining that the mobile device has a threshold number of contacts or friends that are blocked by the second person for the contact list or the social media list;
   determine that the mobile device is an unauthorized device;
   detect an attempt by the unauthorized device to connect to the network; and
   cause the attempt by the unauthorized device to connect to the network to be provided to the second person as a second output status that indicates that the first person is an intruder to the secure location.

9. The computer program product of claim 8, wherein the program code is executable by the processing device to:
   create a log of authorized device connections and unauthorized device connection attempts.

10. The computer program product of claim 8, wherein each of the first output status and the second output status is a message that is configured to be displayed on a television connected to the network.

11. The computer program product of claim 8, wherein the social media list and the contact list are associated with a mobile phone belonging to the second person.

12. The computer program product of claim 8, wherein the the program code is executable by the processing device to determine that the mobile device is an authorized device based on a combination of a username and a credential.

13. The computer program product of claim 8, wherein the secure location of the second person is a building in which the second person is located.

14. The computer program product of claim 8, wherein detecting the connective proximity of the mobile device to the wireless network access point device comprises detecting that the mobile device comes within a range from the wireless network access point device in which the mobile device becomes capable of being connected to the network.

15. An apparatus comprising:
   at least one processor; and
   memory having instructions stored thereon that, when executed by the at least one processor, cause the apparatus to:
      detect a connective proximity of a mobile device being carried by a first person to a wireless network access point device operating at a secure location of a second person;
      determine that the mobile device is an authorized device in response to determining that the mobile device has a threshold number of contacts or friends that are in common with a contact list or a social media list for the second person
      determine that the first person is not an intruder to the secure location in response to determining that the mobile device is an authorized device;
      connect the authorized device to the network;
      cause the connection of the authorized device to the network to be provided to the second person as an output status that indicates that the first person is not an intruder to the secure location;
      determine that the mobile device is an unauthorized device in response to determining that the mobile device does not have the threshold number of contacts or friends that are in common with the contact list or the social media list;
      determine that the mobile device is an unauthorized device;
      detect an attempt by the unauthorized device to connect to the network; and
      cause the attempt by the unauthorized device to connect to the network to be provided to the second person as a second output status that indicates that the first person is an intruder to the secure location.

16. The apparatus of claim 15, wherein the instructions, when executed by the at least one processor, cause the apparatus to:
   create an entry in a log reflecting the attempt by the unauthorized device to connect to the network.

17. The apparatus of claim 15, wherein the instructions, when executed by the at least one processor, cause the apparatus to:
   cause an output status to be provided on an output device that indicates the attempt by the unauthorized device to connect to the network.

18. The apparatus of claim 15, wherein the instructions, when executed by the at least one processor, cause the apparatus to:
   disconnect the authorized device from the network when the authorized device is no longer proximate to the network; and
   create a log comprising an identification of:
      when the device was detected as being proximate to the network;
      when the device connected to the network;
      when the device was detected as no longer being proximate to the network; and
      when the device is disconnected from the network.

19. The apparatus of claim 15, wherein the output status comprises a message configured to be at least one of:
   displayed on a display device; and
   played as an auditory message.

20. The apparatus of claim 15, wherein the secure location of the second person is a building in which the second person is located.

* * * * *